July 18, 1967 C. F. BORCHERT 3,332,047

COMPOSITE SUPERCONDUCTOR

Filed Nov. 26, 1965 3 Sheets-Sheet 1

CARL F. BORCHERT
INVENTOR.

BY Alden D. Redfield
Melvin E. Frederick
ATTORNEYS

CARL F. BORCHERT
*INVENTOR.*

BY Alden D. Redfield
Melvin E. Frederick
ATTORNEYS

July 18, 1967 C. F. BORCHERT 3,332,047

COMPOSITE SUPERCONDUCTOR

Filed Nov. 26, 1965 3 Sheets-Sheet 3

CARL F. BORCHERT
INVENTOR.

BY Alden D. Redfield
Melvin E. Frederick
ATTORNEYS

United States Patent Office 3,332,047

Patented July 18, 1967

3,332,047

COMPOSITE SUPERCONDUCTOR

Carl F. Borchert, Boxford, Mass., assignor to Avco Corporation, Cincinnati, Ohio, a corporation of Delaware Filed Nov. 26, 1965, Ser. No. 509,716

10 Claims. (Cl. 335—216)

The present invention relates to composite metal conductors and more particularly to superconductive conductors comprising a superconductive conductor and a ribbon of electrically conductive normal metal.

In the fabrication of superconductive coils, the characteristics of such coils can be greatly improved by providing the electrical conductor in the form of a stabilized superconductor comprising a ribbon of low resistance normal metal in good thermal and electrical contact with superconductive material extending the length of the ribbon. As used herein, the term "stabilized superconductor" means one which in the presence of adequate cooling returns to the superconducting state following a disturbance, either self-generated (such as a flux jump) or externally generated (vibration, rapid external field change, temporary excess in current, etc. . . . ) without requiring a reduction in excitation current.

In a magnet coil formed of superconducting wire alone (an unstabilized superconductor), if for any reason any part of the wire loses its superconducting characteristics and becomes normal, such as, for example, it reaches a temperature above its critical temperature, its critical current is exceeded, etc., the resistance introduced thereby not only destroys the superconducting mode of operation requiring at the least substantial shutdown of the coil, but also creates forces which may destroy the coil. By way of comparison, a coil comprising a stabilized superconductor is not subject to the above-noted defects and/or disadvantages. In addition to the above, a stabilized superconductor forming a coil can carry a current substantially equal to its short sample current without any adverse effects, whereas an unstabilized superconductor forming a coil can only carry a current which is substantially less than its short sample current. The short sample current referred to immediately hereinabove is the maximum current which a short sample of the superconductor will carry in the maximum magnetic field of the coil without going normal.

In one useful application, a stabilized superconductor comprised a plurality of superconductive wires 10 mils in diameter embedded in a copper ribbon. In another useful application, a stabilized superconductor comprised a ribbon of superconductive material bonded between two copper ribbons in a sandwich construction.

If a composite conductor as described immediately hereinabove is cool enough, no voltage will appear in the conductor until the critical current has been reached, and above the critical current, the voltage across the conductor will rise gradually with the current. Upon lowering the current, this voltage will disappear at the critical current.

If the composite conductor is not adequately cooled, a different situation exists. Consider first the case of an inadequately cooled composite superconductor that is not subject to instabilities or disturbances. In this case, no voltage appears until the current reaches the critical value. At this point, a sudden voltage will appear with the appearance in the circuit of a sizeable resistance. If the current is now lowered, a voltage persists across the conductor until a current much lower than that of the critical current is reached and the superconductor again becomes superconducting. This current can be referred to as the recovery current, and depends on the degree to which the conductor is cooled. If this same composite conductor is subjected to disturbances or instabilities, then the situation is a little different. The disturbances are a destabilizing effect, and at currents above the recovery current and below the critical current the voltage across the conductor may be double valued. The magnitude of the voltage depends on which of the voltage values the coil will operate. However, it takes only one large disturbance to shift the operation from fully superconducting to fully normal. Thereafter, the current must be reduced to the value of the recovery current as determined by the degree of cooling present before superconductive operation is again attained.

It will now be seen that a stabilized superconductor should have as low a resistivity as possible consistent with ease of providing good electrical and thermal contact between the superconducting material and the normal material and that particularly, the rate of removal of heat from the conductor should be sufficient to provide a recovery current not substantially less than the critical current of the conductor. Thus, the recovery current of a stabilized superconductor can be used as a measure of its degree of stabilization; the closer the recovery current to the critical current, the greater the degree of stabilization. While the actual minimum ratio of cross sectional area of normal metal to superconductive material necessary to provide a stabilized conductor has not been finally established (it depends on various interdependent factors), a ratio of four to one of respectively copper and superconductive material has been found to provide a stabilized superconductor wherein only the smooth edges of the superconductor were exposed to the coolant and it is believed that this ratio may be reduced to a ratio of one to one.

In accordance with the principle of the present invention, an improved stabilized superconductor comprises an elongated ribbon of normal material having first and second major side surfaces defining its width dimension and third and fourth minor side surfaces defining its thickness dimension, said normal material having a resistivity at room temperature not substantially greater than that of aluminum at room temperature; superconductive material extending the length of and in intimate thermal and electrical contact with said ribbon; and projections spaced one from another forming part of said ribbon and extending outwardly from said third minor side surface in the width direction of said ribbon.

It is the principal object of the present invention to provide an improved superconductor.

Another object of the present invention is to provide a composite superconductor having improved heat transfer characteristics.

Another object of the present invention is to provide a superconductor which facilitates its formation into a magnet coil.

Another object of the present invention is to provide a stabilized super conductor having increased exposure to the superconducting environment when formed into a magnet coil.

A further object of the present invention is to provide a stabilized superconductor which automatically provides coolant passages when wound into a magnet coil.

A still further object of the present invention is to provide a stabilized superconductor which not only automatically provides coolant passages when wound into a magnet coil but which is resistant to compressive and tensile forces.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
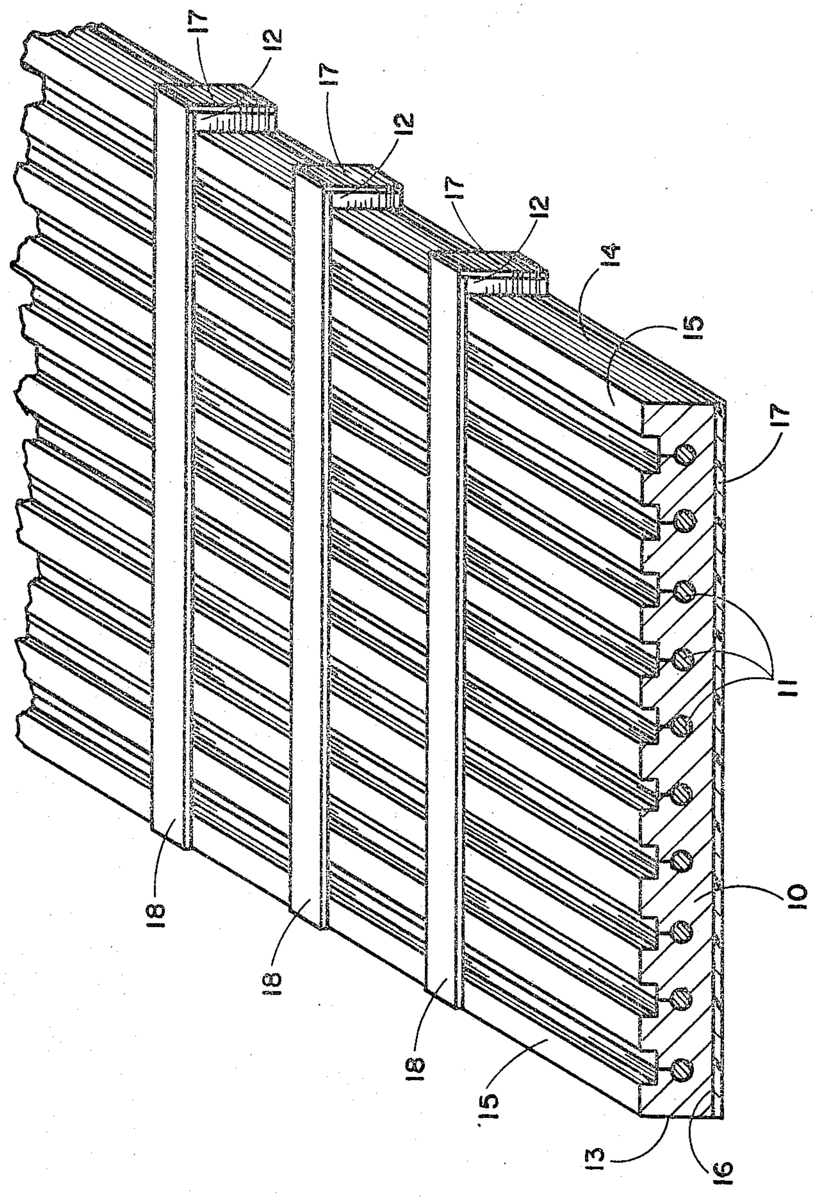
FIGURE 1 is a perspective view on a greatly enlarged scale to facilitate illustration of a stabilized superconductor in accordance with the present invention.

Referring now to FIGURE 1, there is shown a composite superconductor comprising a normal metal strip 10 and nine laterally spaced wires 11 comprised of a superconductive material embedded in the metal strip 10. The metal strip 10 may be comprised, for example, of copper and the superconductive wires 11 may be comprised, for example, of copper-coated niobium-zirconium. The wires are embedded in the metal strip by disposing them in corresponding lateral grooves (not shown) and then enfolding the upper portions of these grooves as by rolling with a suitable die to mechanically lock the superconductive wires in the metal strip as shown in FIGURE 1.

In order to understand the small size of the composite superconductor which may be used, the metal strip may have a width (not including projections 12) between its minor side surfaces 13 and 14 of 0.50 inch and a thickness of 0.040 inch between its major side surfaces 15 and 16. In a strip 0.50 inch wide, nine superconductive wires are the maximum number that can be satisfactorily embedded since a greater number leaves insufficient strip between wires for reliable and proper clinching action.

While the minor side surface 13 is smooth along its entire length, it will be noted that the opposite minor side surface 14 is provided with a plurality of projections 12 spaced one from another along the length of the minor side surface 14. A thin layer of dielectric insulating material 17 such as, for example, Dacron tape impregnated with a B stage epoxy is bonded to and covers major side surface 16 and the extreme outer surface of each projection 12. No insulation is required or for that matter desired on the balance of the conductor. However, spacer strips 18 transverse to the length dimension of the conductor are provided as by soldering on major side surface 15. While the spacers are preferably formed of a material such as copper having a high thermal conductivity, the composition of the spacer strips is not critical to the invention and in cases requiring minimum cooling the spacer strips may be omitted if desired. Further, while the spacer strips 18 are shown as being disposed at the projections 12, they may be disposed at different locations if desired.

Figure 2:
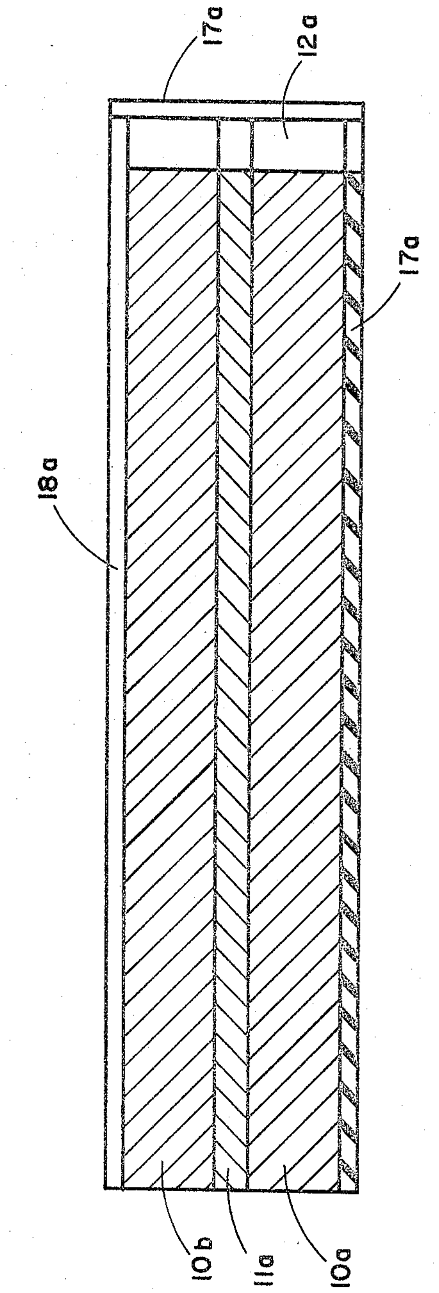
FIGURE 2 is an end view on a greatly enlarged scale of a stabilized superconductive conductor in accordance with the present invention wherein the superconductive material is in the form of a ribbon.

Directing attention now to FIGURE 2, there is shown a modification which utilizes superconductive material 11*a* in the form of a ribbon. As shown in FIGURE 2, the superconductive ribbon 11*a* extends the width of the conductor and is preferably bonded between two normal metal strips 10*a* and 10*b*. Similar to the composite conductor shown in FIGURE 1, there is also provided insulation 17*a*, projections 12*a* and spacers 18*a*.

Figure 3:
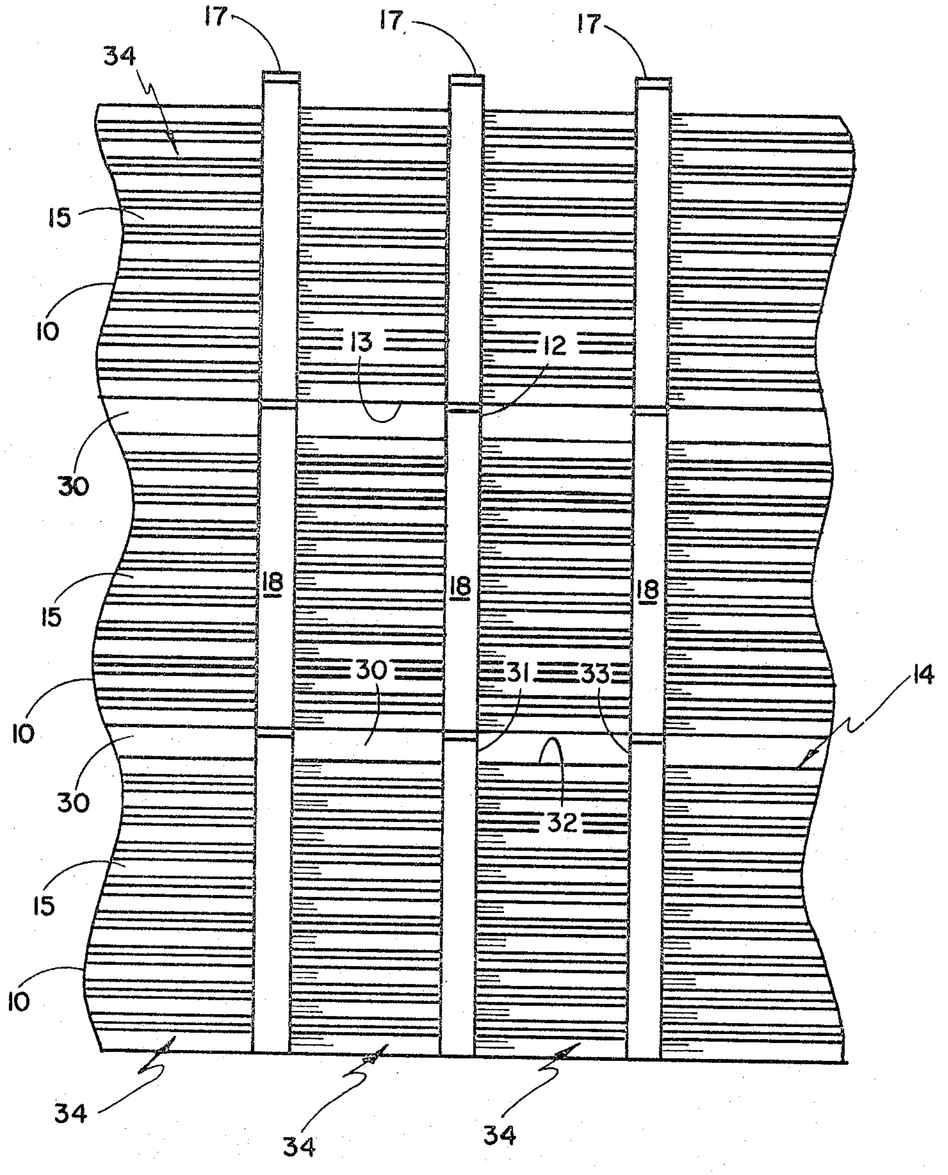
FIGURE 3 is a top fragmentary view of a plurality of portions of the stabilized superconductor of FIGURE 1 wherein the portions are disposed in side by side relationship to form coolant passages.

FIGURE 3 shows a plurality of portions of a composite conductor in accordance with that shown in FIGURE 1 in side by side arrangement as may occur, for example, when the conductor is wound into a coil wherein a plurality of turns form a plurality of layers. For purposes of discussion, it may be assumed that the top turns of three layers are shown in FIGURE 3. Inspection of FIGURE 3 shows that the projection 12 in combination with the opposing minor side surface 13 of the next adjacent turn of the conductor forms a plurality of passages 30 for receiving a coolant such as liquid helium. It is significant to note that the cross sectional area of bare portions 31, 32, and 33 may be selected to provide a cross sectional area greater than that of the oppositely disposed portion of side 13 plus that of the adjacent projections 12 to provide the maximum possible cross sectional area of the edges exposed to the coolant, and this in addition to defining the coolant passages per se. Thus, in addition to eliminating the necessity of separately providing additional spacers between layers, a greater cross sectional area of the conductor is exposed to the coolant than if the additional spacers were used. Further, the spacer strips 18 also in part form in the width direction of the conductor coolant passages 34 which are in communication with the aforementioned coolant passages 30 in the thickness direction of the conductor.

In the event projections 12 are provided in the conductor prior to the use of a conductor to form a coil, the projection 12 of one portion of the conductor will not necessarily coincide with the spacer strips of the adjacent portion of the conductor as shown in FIGURE 3 and thereby define rectangular prismatic coolant passages. However, there will still be present interconnected coolant flow passages all along the thickness direction of the conductor. Where rectangular prismatic coolant flow passages are desired to reduce the possibility of blockage, due to gas bubbles, for example, the conductor may be provided with the necessary excess material on one side and the projections 12 formed by machining grooves in that side of each layer after it is formed taking care, however, to prevent shorting between layers which may result from the machining operation. On the whole, this may be simply achieved by coating the exposed edges of the conductor forming each layer with a thermosetting plastic prior to machining the grooves.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

1. A composite superconductive conductor comprising:
   (a) an elongated ribbon of normal material having first and second major side surfaces defining its width dimension and third and fourth minor side surfaces defining its thickness dimension, said normal material having a resistivity at room temperature not substantially greater than that of aluminum at room temperature;
   (b) superconductive material extending the length of and in intimate thermal and electrical contact with said ribbon; and
   (c) projections spaced one from another forming part of said ribbon and extending outwardly from said third minor side surface in the width direction of said ribbon.

2. The combination as defined in claim 1 and additionally including electrical insulating means substantially covering said first major side surface and the outermost surface of each of said projections.

3. The combination as defined in claim 1 wherein said superconductive material is also in the form of a ribbon.

4. The combination as defined in claim 1 and additionally including strips spaced one from another, carried by one of said major surfaces and extending substantially across said ribbon in its width direction.

5. The combination as defined in claim 1 wherein said superconductive material comprises a plurality of wires embedded in said ribbon.

6. The combination as defined in claim 2 wherein said superconductive material comprises a plurality of superconductive wires embedded in said second major side surface.

7. The combination as defined in claim 6 wherein said fourth minor side surface and the portions of said third minor side surface intermediate the outermost surfaces of said projections are exposed and additionally including strips spaced one from another, carried by said second major side surface and extending substantially across said ribbon in its width direction.

8. The combination as defined in claim 2 wherein said superconductive material is in the form of a ribbon not substantially less narrow than said ribbon of normal material.

9. The combination as defined in claim 8 wherein said fourth minor side surface and the portions of said third minor side surface intermediate the outermost surfaces of said projections are exposed and additionally including strips spaced one from another, carried by said second major side surface and extending substantially across said ribbon in its width direction.

10. The combination as defined in claim 6 wherein said fourth minor side surface and the portions of said third minor side surface intermediate the outermost surfaces of said projections are exposed, said composite conductor being wound into a coil wherein said third and fourth surfaces of respectively different portions of said ribbon are oppositely disposed to one another and define a plurality of passages therebetween.

References Cited

UNITED STATES PATENTS

| | | | |
|---|---|---|---|
| 3,281,738 | 10/1966 | Hanak | 335—216 |
| 3,306,972 | 2/1967 | Laverick et al. | 335—216 X |

FOREIGN PATENTS

| | | |
|---|---|---|
| 1,402,426 | 5/1965 | France. |

BERNARD A. GILHEANY, *Primary Examiner.*

G. HARRIS, *Assistant Examiner.*